Nov. 26, 1968  R. K. FRITSCHE  3,413,131
METHOD OF FAT-CONTAINING FOOD PRODUCT PACKAGING
Filed Dec. 7, 1964  5 Sheets-Sheet 1

INVENTOR
RICHARD K. FRITSCHE
BY John Gibson Semmes
ATTORNEY

Nov. 26, 1968     R. K. FRITSCHE     3,413,131
METHOD OF FAT-CONTAINING FOOD PRODUCT PACKAGING
Filed Dec. 7, 1964     5 Sheets-Sheet 2

INVENTOR
RICHARD K. FRITSCHE
BY *John Gibson Semmes*
ATTORNEY

Nov. 26, 1968  R. K. FRITSCHE  3,413,131
METHOD OF FAT-CONTAINING FOOD PRODUCT PACKAGING
Filed Dec. 7, 1964  5 Sheets-Sheet 3
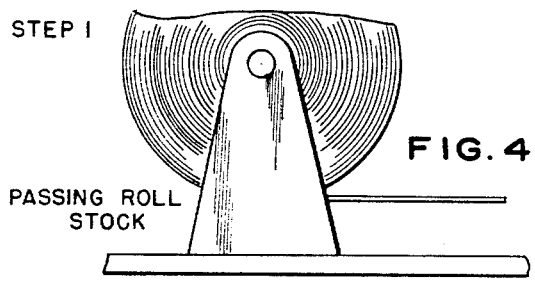
STEP 1
PASSING ROLL STOCK
FIG. 4
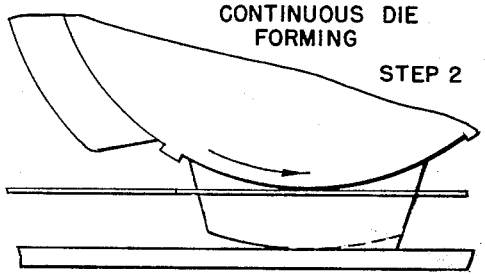
CONTINUOUS DIE FORMING
STEP 2
FIG. 5
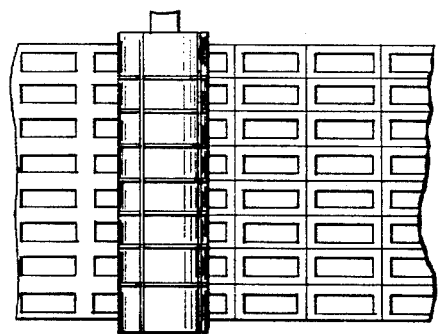
STEP 3  CUTTING SEGMENTS
FIG. 6
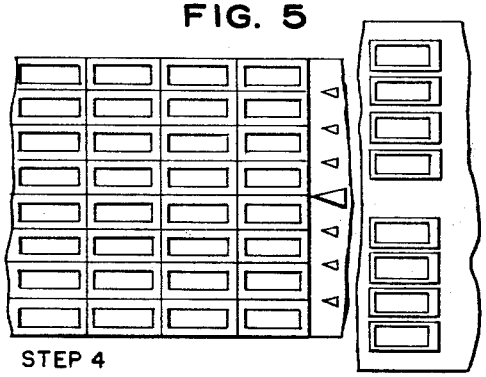
STEP 4  SPACIALLY SEPARATING
FIG. 7
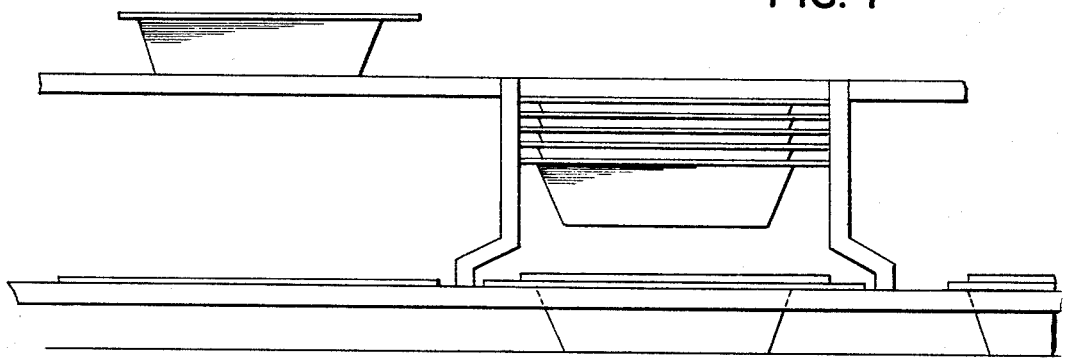
STEP 5  FRAMING PLURAL SEGMENTS  FIG. 8
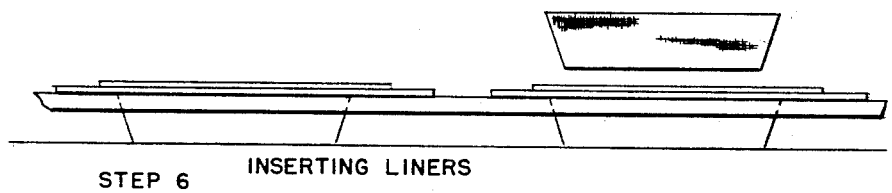
STEP 6  INSERTING LINERS
FIG. 9
INVENTOR
RICHARD K. FRITSCHE
BY Semmes & Semmes
ATTORNEYS Nov. 26, 1968  R. K. FRITSCHE  3,413,131
METHOD OF FAT-CONTAINING FOOD PRODUCT PACKAGING
Filed Dec. 7, 1964  5 Sheets-Sheet 4
FIG. 10
STEP 7
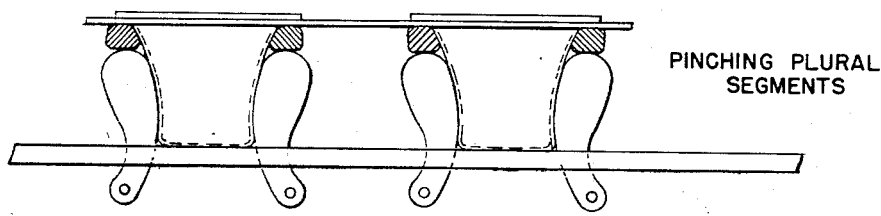
PINCHING PLURAL SEGMENTS
STEP 8  FIG. 11
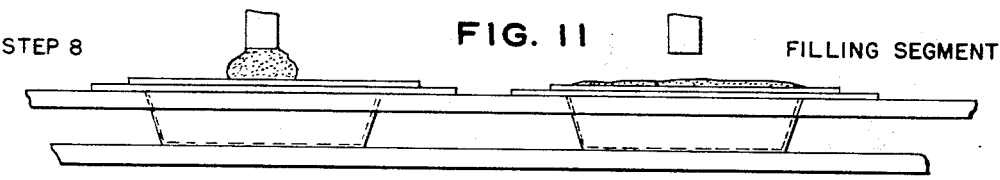
FILLING SEGMENTS
STEP 9  FIG. 12  FIG. 13  STEP 10
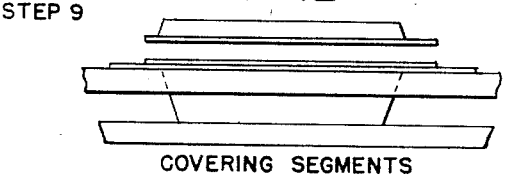 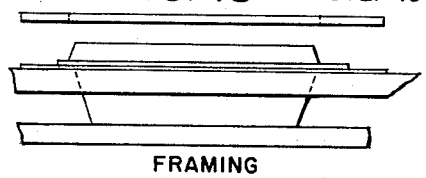
COVERING SEGMENTS  FRAMING
STEP 11
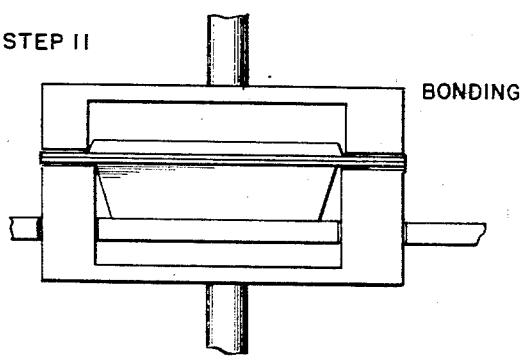
BONDING
FIG. 14
*INVENTOR*
RICHARD K. FRITSCHE
BY Semmes & Semmes
*ATTORNEYS*

Nov. 26, 1968  R. K. FRITSCHE  3,413,131
METHOD OF FAT-CONTAINING FOOD PRODUCT PACKAGING
Filed Dec. 7, 1964  5 Sheets-Sheet 5

INVENTOR
RICHARD K. FRITSCHE
BY Semmes & Semmes
ATTORNEYS

United States Patent Office 3,413,131
Patented Nov. 26, 1968

3,413,131
METHOD OF FAT-CONTAINING FOOD PRODUCT PACKAGING
Richard K. Fritsche, Fort Thomas, Ky., assignor to The Miami Margarine Company, Cincinnati, Ohio, a corporation of Ohio
Continuation-in-part of application Ser. No. 92,371, Feb. 28, 1961. This application Dec. 7, 1964, Ser. No. 416,563
11 Claims. (Cl. 99—179)

ABSTRACT OF THE DISCLOSURE

Continuously forming a plurality of filled food container segments by sequentially exposing the segments to a "natural flow" fat product, spacially separating filled segment counterparts and grouping same to unite not only the food products but the segments as well as the latter to form a readily separable, package.

The present invention relates to the packaging of fat containing food products, and more especially to the system of continuously forming food package counterparts while sequentially "Natural Flow" filling and assembling said counterparts to produce a united and packaged product readily severable from like units.

This application is a continuation-in-part of co-pending application 92,371, filed February 28, 1961, by Richard K. Fritsche, now abandoned.

Various attempts have been made in the art to effect the packaging of margarine, as a fat containing food, in a continuous process in conventionally accepted shapes, i.e. one-quarter pounds, one pound solids, and one-half pound so-called Country Roll. However, due to the status of the machine art, reciprocating design for molding and cartoning slows the rate of production and ultimately the yield obtainable through conventional equipment. The rate of production or yield would thus be substantially enhanced if one could obtain advantage of the "Natural Flow" characteristics of margarine through sanitary piping. Additionally, it would vastly augment the production rate in packaging of such foods, if variant sized and shaped margarine could be used on the same continuous line, all without substantial modification of the packaging equipment. (e.g. Eastern style one-quarter pound prints, Western style one-quarter pound prints, one pound Elgin Style prints, and/or one-half pound Country Roll or one-half pound patties.)

In the manufacture and packaging of margarine food products, it is commonly known that 20 to 25 percent of solid glycerides should be present in the oil blend at room temperature in order that kneading, molding and printing can be effected. Additionally, such margarine oil blends as have high ratios of liquid glycerides, and especially those containing high percentages of the poly-unsaturated fatty acids (anti-cholesterol agents) are soft and difficult to form and print in conventional packaging machinery. The softness of these currently designed products would normally require either the addition of a hard base and/or the intermittent dispensing thereof, rather than by "Natural Flow" and hence diminish the desired rate of continuous production such as is within the objective of this present invention. It is to this modern trend in packaging that the present invention is directed.

American margarine is essentially a mixture of about 80% properly hardened edible oil and a remaining 20% that consists mainly of skim milk, which usually holds a quantity of salt in solution. Components are brought together at a temperature at which the oil is liquid, and the mixture forms an unstable water in oil emulsion.

In the United States, the great bulk of margarine is made by the "Votator" Process. The "Votator" is a wiped surface heat exchanger. It consists of an externally refrigerated tube equipped with a rotating shaft which extends through its center. On the shaft are mounted blades which scrape or wipe the inner surface of the refrigerated tube. The tube may be refrigerated by the direct evaporation of a refrigerant, i.e. ammonia or Freon, or it may be cooled convectionally by the circulation of chilled brine or some other coolant.

As margarine emulsion is pumped through the tube, the revolving scraper blades continually remove chilled emulsion from the wall of the tube, and unchilled material recoats the wall and is chilled. The chilled margarine emulsion passes from the Votator to a chamber where it is allowed to remain at rest for a short period of time. The purpose of this quiescent period is to allow time for crystal growth in the fat. The chilling in the Votator under agitation produces a system of crsytalline nuclei in the fat. As the emulsion travels through the process, crystals of fat grow around these nuclei. The growth is slow compared to a substance like water. The result is that the latent heat of crystallization is released slowly as crystallization proceeds, and the temperature of the mass actually will increase slightly as the heat accumulates.

At ordinary temperatures, which in this case will be those temperatures between 50° F. and 92° F., a plastic fat will always contain liquid and solid fat. As a matter of fact, the plastic range of a fat is a range of temperatures between that temperature at which the fat is completely liquid and the temperature at which the fat is completely solid.

When a completely liquid fat or emulsion of an aqueous phase in a completely liquid fat is deposited in a chamber or in an open receptacle after being chilled in a "Votator" heat exchanger, the fat will be deposited as a super-cooled liquid. As crystallization proceeds the mass will set and become semi-solid. As little as 5% solid fat can produce this semi-solidity. This semi-solidity is the result not only of the mere presence of the fat crystals, but also of an interaction or interlacing of the fat crystals as they grow.

The refrigeration on the "Votator" can be controlled by adjusting the back pressure on the ammonia refrigerant gas or by adjusting the coolant temperature accordingly to the method of refrigeration used. As the tube temperatures are lowered, the number of crystalline nuclei is increased. If the number of crystalline nuclei is increased the margarine will be more rigid when it emerges from the process even though the percentage of solid fat might be low under normal conditions. Correspondingly, if the temperature is increased the number of nuclei will be decreased and a less firm product will emerge at the filling or discharge sequence. Even the latter product, however, will achieve rigidity after being filled in a container if a proper time element is introduced to accomplish this purpose.

This packaging method disclosed herein provides sequential steps for making, filling and assembling packages shown in Patent 3,144,343 issued August 11, 1964, and in Design Patent 199,200 issued September 22, 1964. Continuous food packaging disclosed herein has application to many other packages, including snapped-together margarine containers.

The invention may be more readily comprehended by reference to the following drawings in which:

FIGURE 3 represents the bonded group, ready for shipping container placement, case packing or the like;

Figure 15:
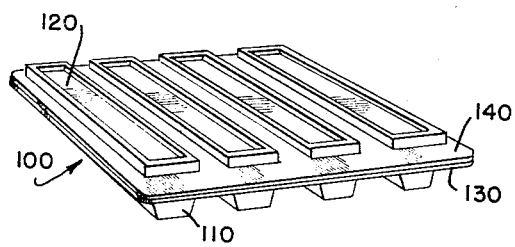
Figure 16:
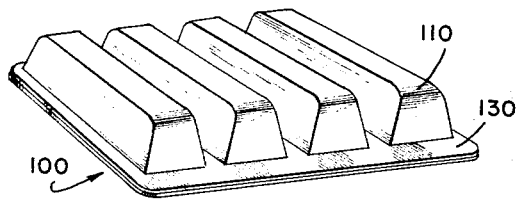
Figure 17:
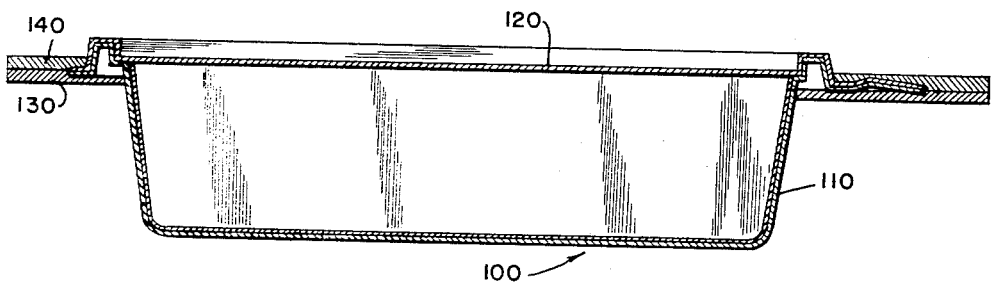

FIGURES 4 through 14 schematically represent the steps of a second embodiment of the food packaging process which comprises this invention;

FIGURE 15 is a perspective view of the package product of the steps of FIGURES 4 through 14;

FIGURE 16 illustrates the package of FIGURE 15, as it is marketed in an inverted attitude;

FIGURE 17 is a longitudinal section of a package as it leaves FIGURE 14, Step 11 of the second process embodiment;

Referring to Sheet I and the first packaging process disclosed thereon, eight actions are performed in packaging the food product.

STEP I

Figure 1:
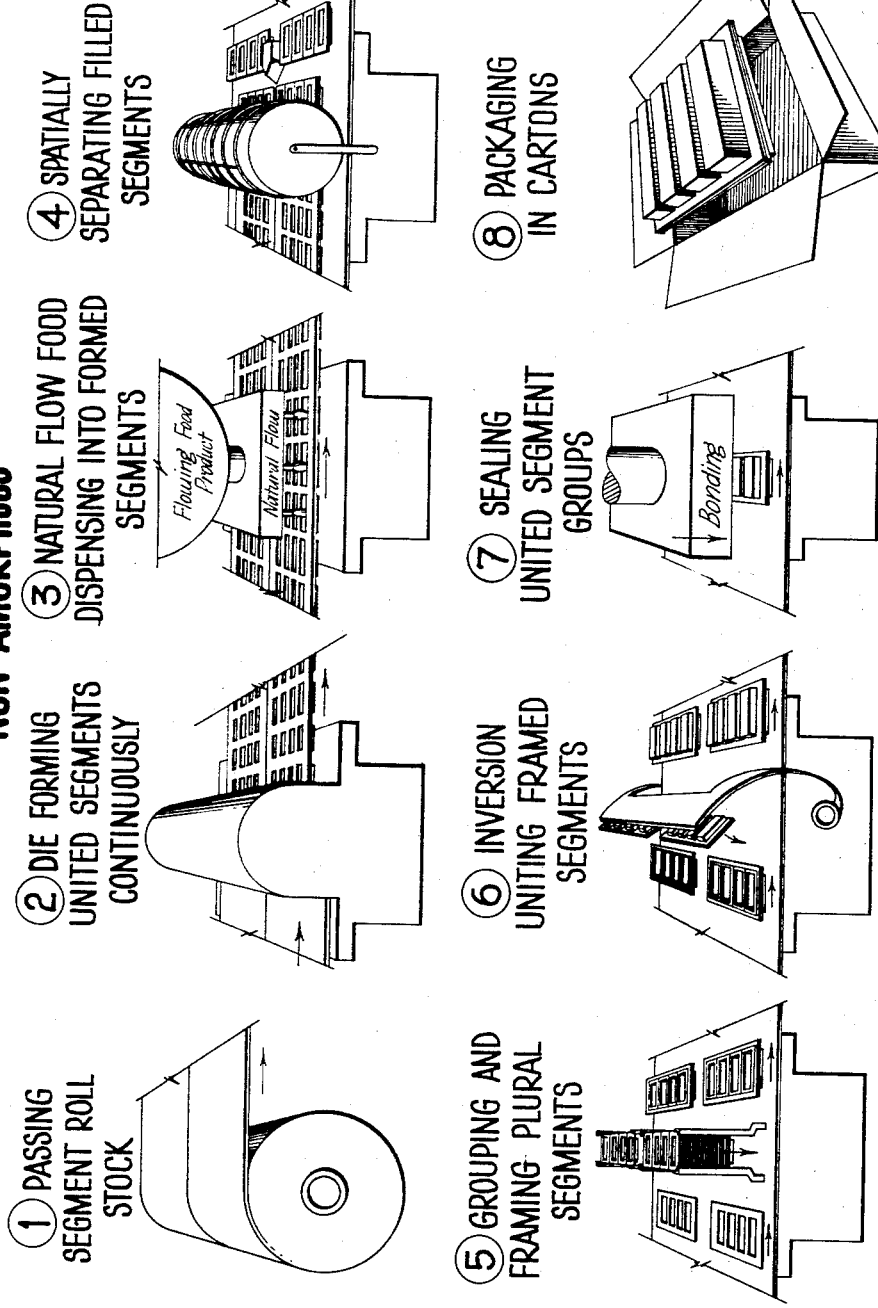
FIGURE 1 is a schematic flow sheet drawing depicting the stations employed in the sequential packaging operation.

It will be observed from reference to FIGURE 1 that the method includes passing the package segment, rolled stock from a first station to a rotary die forming station. The stock may comprise a plastic sheet of either polystyrene, polyvinylchloride, polyethylene, or similar plastic having a thickness varying from .75 mil to 2 mils where a plural impression may be desired on a single sheet belt. In operation, the stock passing from the first station may, as shown, comprise two belt strands in side-by-side relation.

STEP II

Die forming of the united segments is effected substantially continuously through the use of stippling drums having interchangeable dies of variant size and shape.

STEP III

Thereafter, the die formed sheets having depressed cavities forming the segments, are conveyed into continuous filling relation with a plurality of dispensers. The dispensers are adapted to utilize the "Natural Flow" characteristics of fat containing food products, in this example, margarine. The dispensers receive margarine from "Votators", and the viscosity of that fat containing food product may be regulated through "Votator" control. Additionally, at this dispensing station "Natural Flow" is coordinated in speed with the speed of conveyance of the die formed united segments still moving in continuous bands.

As margarine is deposited in the cavities some crystallization has already taken place. Further crystal growth and interlacing of crystals cause the margarine to solidify. A semi-solid state is noted when only five percent crystallization has taken place.

STEP IV

Following natural flow dispensing into formed segments, the segments which are now filled are cut simultaneously, longitudinally and transversely at Station IV; whereupon they are spacially separated in preparation for grouping and framing following in Step V.

STEP V

In Station V, the side-by-side grouped segments are individually spaced and then framed from beneath by a substantially rigid backed board having a heat sealing polyethylene or the like on at least one surface thereof. Portions of the frame which retain the filled segments in side-by-side relation overlap flanges of the respective segments to expose heat sealable portions as will be defined hereinafter.

STEP VI

Following the filling, cutting, grouping and framing as aforesaid, crystallization and solidification of the margarine has proceeded so that uncovered segments may be raised and inverted. Respective framed segments, now comprising trays, are rapidly inverted and united as in Step VI, providing a complete group of united segments having opposed and corresponding frame members in vertical alignment for sealing to follow. No spilling upon inversion is encountered since a minimum crystallization creates a semi-solid state of the product. See FIGURE 2. Alternative to complete inversion uniting, the framed segment groups may be raised from horizontal to opposed vertical, precedent to bonding. The bonded segment group thus formed may be defined as follows.

STEP VII AND STEP VIII

In Step VII the respective opposed frame members are bonded. The bonding is preferably effected by bonding of the opposed frame counterparts, per se. This may be accomplished by either heat sealing the opposed portions having polyethylene binder or simply compressing opposed portions having pressure-sensitive media adherent to the frame.

Figure 2:
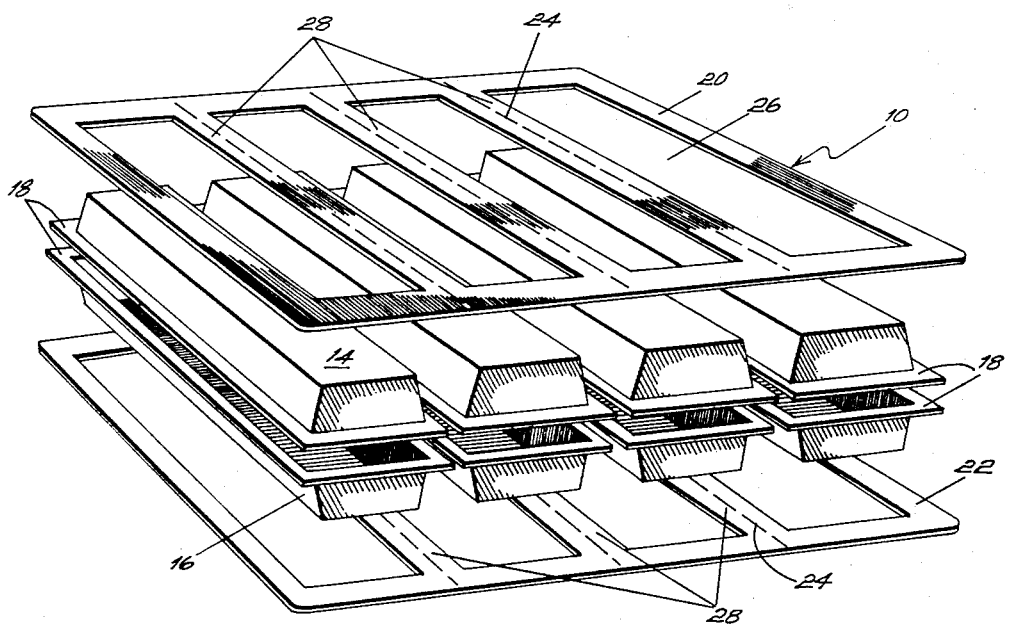
FIGURE 2 illustrates an unassembled group of the type manufactured by the process containing a plurality of segments in side-by-side relation.
Figure 3:
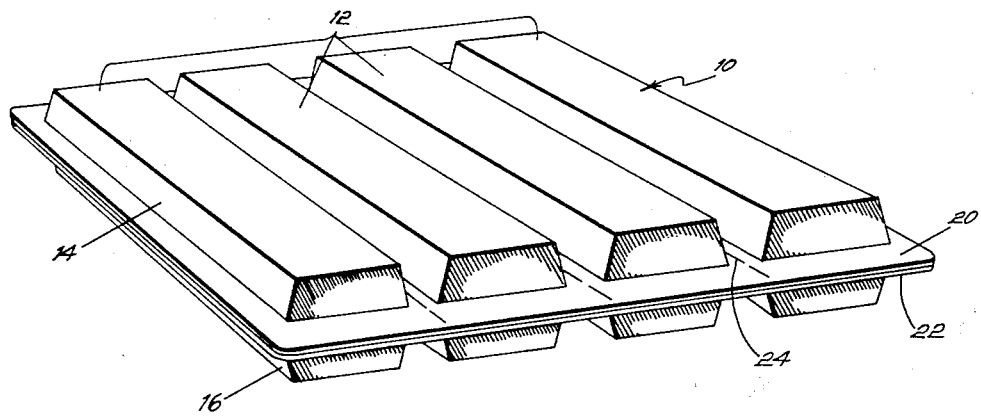

In FIGURE 2, food package 10 is illustrated as embodying individual food compartments which are individually comprised of opposed top segment 14 and bottom segment 16. The respective top and bottom segments include at the point of their opposition peripheral flanges 18, as shown. These individual top and bottom segments together comprise a food compartment 12, better illustrated in FIGURE 3. The individual segments 14 and 16 are secured together and the respective food compartments 12 are secured in spaced side-by-side relationship by means of the upper or top frame 20 and the bottom or lower frame 22 each including cut-outs 26 and the medial running members 28. The top frame 20 and bottom frame 22 respectively overlie the individual top and bottom segments and upon pressurization may abut each other about the peripheries 18 of the pairs of opposed segments. As illustrated in FIGURE 2, medial running members 28 may embody longitudinal perforations 24 which provide for individual tearing separation of the respective food compartments 12. The frames 22 including running members 28, may be fabricated of polyethylene or like plastic backed board, and may be heat sealed to each other about the peripheral flanges of the top and bottom segments. Otherwise, a pressure sensitive bonding media may be employed, bonding the respective opposed surfaces of the frame to each other, but avoiding bonding of the food containing compartments, per se. As presently contemplated, counterpart segments are separately filled, brought to an opposed relationship, then the overlaying frames are sealed or bonded to one another in order to secure the individual compartments in side-by-side relationship.

SECOND EMBODIMENT

A second embodiment of a continuous process for forming and filling packages for a fat containing food product, including margarine, is shown in Sheets 3 through 5 of the drawings. In Step 1, polymer or metallic foil stock, having a thickness of from .75 to 2 mils, is unrolled and passed in a horizontal plane. The plane may comprise a moving surface or belt having spaced apertures to receive dies. Continuous forming parallel cavities in the stock is performed in Step 2 by a drum-shaped rotary die. Each cavity is formed with a continuous outwardly extending, re-entrantly turned edge, which supports at the outermost extremity thereof a continuous laterally extending flange.

In Step 3, the sheet is cut into several segments, each having a centrally located cavity. Cutting of the sheets is accomplished by a rotating drum having series of parallel and perpendicular knives. Cut segments are spacially separated by wedges during Step 4, to the spaced parallel relation which individual segments will assume in a final compound package. In this case, segments are grouped into lots of four, and each cavity will contain one quarter pound of the fatty food product. Grouped segments continue along a moving belt, and in Step 5 the segments are dropped into parallelly moving frames. Parchment liners are inserted in cavities in Step 6.

On the next sheet of drawings it is shown that each segment is laterally pinched (Step 7) to compress the cavity immediately prior to filling in Step 8. Compression of the cavities is maintained by a series of parallel rails until lids have been firmly positioned in Step 9. Sequential Steps 9 and 10, illustrate lids being placed on the segments and frames being placed over the lids. Lids have a raised planer base, a continuous generally downward extending side and a continuous flange extending laterally from the lower most extremity of the side. The purpose of the side is to encompass and firmly grasp the outwardly extending edge of the cavity. The newly placed frames directly abut and complement the frames added in Step 5, surrounding segment and cover flanges. Finally, in Step 11, the frames, which have bonding material on opposing surfaces, are sealed by applying local pressure or heat.

On Sheet 5 of the drawings, FIGURE 15 illustrates a completed package as it leaves the assembly line. Numeral 100 generally indicates the completed package. 110 denotes the segment cavity. Lids or covers are represented by the numeral 120, and 130 and 140 respectively identify underlying and overlying frames. FIGURE 16 reveals the inverted, marketed form of the package, similar to that shown in Design Patent 199,200. FIGURE 17 is a longitudinal cross section of a filled package immediately following the bonding Step 14.

Steps of the related embodiments of a food packaging process may be interchanged. Thus, the filling step, Step 8, of the second embodiment might be relocated as taught by the first embodiment. Consequently, the cavities may be filled directly after their formation, and before cutting the sheet into cavity containing segments. Pinching the cavities may occur immediately after the cavities are formed and before they are filled, or shortly before covers are placed on the segments.

As will be apparent, the flanges of the individual segments may be modified or eliminated, a single overlay frame may be employed, bonding may be by means of other than heat sealing and various other modifications in configuration of concave segments, overlying framing and juxtapositioning of elements may be adopted without departing from the spirit and scope of invention as defined in the sub-joined claims. The claimed process disclosed herein has direct application to unframed margarine packages having snapped-together bottom and top segments.

Although specific attention has been given the fat containing product it is within the invention to package other semi-solid foods including "spreads," jellies, gelatine and the like., Whereas the method invention has been defined with specific reference to listed steps, it will become apparent that various of the steps may be effected simultaneously without departing from the spirit of the invention as defined in the appended claims.

I claim:
1. In the packaging of fat containing food products characterized by crystallization and solidification, a continuous-line method comprising:
 (A) continuously forming from plastic material open-top food container segments in a continuous belt, while conveying same;
 (B) sequentially gravity filling said segments with the food products while under conveyance;
 (C) separating the segments endwise and medially;
 (D) thereafter grouping and framing groups of segments;
 (E) sequentially uniting groups of the framed segments; and
 (F) sealing the frames.
2. The packaging method according to claim 1 in which uniting and grouping of the segments is effected simultaneously.

3. The packaging method according to claim 1 wherein the segments are continuously die formed.
4. The packaging method according to claim 1 wherein the segments are die formed integrally of the belt in groups disposed in continuous column of the said belt.
5. A method of continuous line packaging of fat containing food product characterized by crystallization and solidification comprising the steps of:
 (A) forming opposed food container segments from a thermoplastic material;
 (B) sequentially filling the segments by natural flow dispensing of the food product;
 (C) uniting respective filled segments into individual containers; and
 (D) placing a frame over united portions of said containers and trereafter bonding said frame to respective individual containers.
6. The method according to claim 5 in which respective segments are spaced from each other and framed precedent to seal-packaging thereof.
7. An assembly line method of semi-solid food packaging comprising:
 (A) unrolling plastic sheets;
 (B) rotary stippling thereby forming columns of flanged container segments in said moving sheets;
 (C) continuously dispensing fat containing semi-solid food into the moving segments;
 (D) separating and spacing the moving container segments from each other and into columnar groups;
 (E) placing a moving rigid cut out frame having a pressure sensitive face under each group;
 (F) pairing and mutually opposing the framed groups of spaced segments with said flanges intermediate said frames; and
 (G) pressure sealing said frames.
8. A continuous method for the assembly line production of food packages for fat containing food products characterized by crystallization and solidification comprising:
 (A) unrolling thin plastic stock, selected from a group consisting of polystryrene, polyvinylchloride and polyethylene;
 (B) continuously die forming flanged segments in the rolled stock;
 (C) filling said segments;
 (D) continuously cutting said flanged segments, longitudinally and transversely;
 (E) continuously columnar spacing said segments;
 (F) grouping and framing said segments from beneath by substantially rigid frames, having a bonding material on at least one face thereof and defining cut-outs equal in number to the number of individual segments, in each group, portions of said frame which retain said filled segments overlapping segment flanges and exposing frame bonding material;
 (G) inverting alternate groups of frame segments and pairing inverted groups with non-inverted groups; and
 (H) bonding said frames.
9. In the packaging of fat containing food products characterized by crystallization and solidification, a continuous line method comprising:
 (A) continuously forming from .75 to 2 mils plastic material, flanged open-top food container segments in a continuous belt, while conveying same;
 (B) sequentially gravity filling said segments with the food products while under conveyance;
 (C) separating the segments endwise and medially;
 (D) thereafter grouping and placing rigid supporting frames on groups of segments;
 (E) sequentially uniting groups of the framed segments, with segment flanges intermediate said frames overlapping said flanges; and
 (F) sealing the frames.

10. A process for continuous packaging of fat containing foods characterized by crystallization and solidification, comprising:
 (A) forming package segments having central food-receiving cavities surrounded by outwardly turned edges;
 (B) continuously filling said cavities;
 (C) covering said cavities with lids having raised planar bases, continuous generally downward turned sides, and laterally extending flanges;
 (D) urging said lids downwardly on said segments, whereby said bases seal said cavities and whereby said sides firmly grasp said segments, retaining said bases and said cavities in sealed relationship; and
 (E) laterally squeezing said segment cavities prior to filling and continuing said lateral squeezing until after said lids are urged downwardly on said segments.
 (F) uniting respective filled segments into individual containers; and
 (G) placing a frame over united portions of said containers and thereafter bonding said frame to respective individual containers.

11. In the packaging of semi-solids fat containing food products, a continuous line packaging method comprising:
 (A) continuously passing a deformable material onto a moving surface having a series of spaced apertures;
 (B) continuously die forming spaced cavities in said stock by impressing a rotary stippling die therein;
 (C) cutting said stock into parallel segments, each segment including a centrally positioned cavity surrounded by a continuous laterally extending flange;
 (D) spacially separating said segments and grouping spaced segments;
 (E) dropping said grouped segments into parallel moving apertured frames;
 (F) inserting parchment liners in said cavities;
 (G) laterally pinching said segments, thereby compressing said cavities;
 (H) filling said cavities with fat containing semi-solid food products;
 (I) covering said segments;
 (J) placing overlying apertured frames on covered segments, said frames being apertured complementary and being coextensive with frames added in Step E; and
 (K) bonding said frames.

References Cited

UNITED STATES PATENTS

| | | | |
|---|---|---|---|
| 2,707,588 | 5/1955 | Amberg. | |
| 2,736,656 | 2/1956 | Marshall | 99—171 |
| 2,867,537 | 1/1959 | Whitaker | 99—178 |
| 2,879,635 | 3/1959 | Brock | 99—171 |
| 2,958,168 | 11/1960 | Vogt | 53—30 |
| 3,010,263 | 11/1961 | Carew et al. | 53—37 |

RAYMOND N. JONES, *Primary Examiner.*